2,976,182
Patented Mar. 21, 1961

2,976,182

ELASTOMERIC VAPOR-PERMEABLE FILMS AND COATINGS

John R. Caldwell, Clarence C. Dannelly, and Edward H. Hill, Kingsport, Tenn., assignors to Eastman Kodak Company, Rochester, N.Y., a corporation of New Jersey No Drawing. Filed Dec. 10, 1957, Ser. No. 701,715

16 Claims. (Cl. 117—135.5)

This invention concerns the preparation of elastomeric vapor-permeable coatings which are waterproof to liquid water and to their use for coating fabrics.

In connection with preparing rainwear and other types of wearing apparel which are intended to be waterproof to liquid water, it has been desirable to provide a material which will transmit water vapor. Various formulations have been suggested for this purpose, one of which has been disclosed in U.S. Patent 2,759,900, issued August 21, 1956, to Caldwell et al. which discloses the preparation of synthetic resinous compositions prepared by polymerizing an acrylic acid ester while admixed with carboxy alkyl cellulose ethers.

Various other polymeric compositions have been used for waterproofing fabrics such as those prepared from acrylic acid and acrylic acid esters along with other polymerizable materials and the like such as those disclosed in U.S. Patent 2,140,048, issued to Fikentscher et al. However, when many of these polymerizable compositions have been used as sheets, films or coatings on textile fibers, the coated material has been vapor-tight as well as waterproof, and there has been a need for textile coatings for rainwear which would provide a waterproof coating but which would enable water vapor to pass through the fabrics. At the same time it is desirable that the textile coating be resistant to solvents ordinarily used in dry cleaning as well as resistant to soaps and detergents, so that the rainwear would not require a subsequent recoating after each dry cleaning.

Some of the coatings which have been developed in the past which were waterproof to liquid water and which transmitted water vapor have not been satisfactory for coating fabrics due to the stiffening action which was imparted to the materials and which rendered them unsuitable for wearing purposes.

We have discovered a coating composition which can be used for coating fabrics in order to render the material waterproof to liquid water and yet will pass water vapor. In addition to this desirable characteristic, the material so coated is flexible and has good wearing characteristics.

One object of this invention is to provide an elastomeric liquid-waterproof film which is permeable to water vapor. Another object of this invention is to provide a method of coating fabrics, so that they will be waterproof to liquid water and yet transmit water vapor. A further object is to provide a waterproofing material for textile fabrics which renders the material flexible and yet is resistant to removal by dry cleaning solvents. A further object is to provide a method of preparing a polymeric composition comprising an elastomeric material containing hydrophilic polymeric pigments. An additional object of the invention is to provide methods of preparing waterproof films that contain cross-linked polymers which have polar hydrophilic groups such as amide groups.

The objects of this invention are accomplished by suspending hydrophilic polymer pigments in aqueous or organic liquid suspensions of various elastomeric materials or in organic solutions of various elastomeric materials. These suspensions or solutions are used to cast films and to impregnate or coat textile fabrics, leather, and paper, and may be improved by adding curing agents, plasticizers, stabilizers, and the like. The films and coated fabrics, leather and paper are water vapor-permeable but remain waterproof.

The ability of the elastomeric coatings to transmit water vapor is due to the presence of certain hydrophilic organic pigments which are added to the suspensions or solutions of elastomeric materials.

These hydrophilic cross-linked polymers in pigment form are made from monomers which contain certain polar groups. The polar groups in these organic pigments are those which show a strong attraction for water such as amide links. The polymers which have these polar groups are prepared by co-polymerization of various polar monomers with cross-linking agents. The method of polymerization is disclosed in co-pending patent applications Serial Nos. 623,533 and 623,534, both filed November 21, 1956. The polar polymerizable monomers are listed according to the polar group which they contain.

The following polymerizable monomers illustrate but do not limit the invention. These monomers are polymerized using cross-linking agents such as divinyl benzene, N,N'-methylenebisacrylamide, ethylene glycol diacrylate, pentaerythritol tetraacrylate, and diallyl ether. Some of the organic polymers may also be cross-linked by the reaction of carboxyl groups on the polymer chain with multi-valent cations such as divalent calcium and trivalent aluminum:

Polymers and copolymers containing N-substituted acrylamide, methacrylamide, unsubstituted acrylamide, fumaric amide and substituted fumaric amides, polymers and copolymers made from vinyl acetate, beta hydroxyethyl acrylate, allyl alcohol, and N-methylol derivatives of acrylamide and methacrylamide.

Our preferred embodiment employs a polymeric composition having the following structural formula:

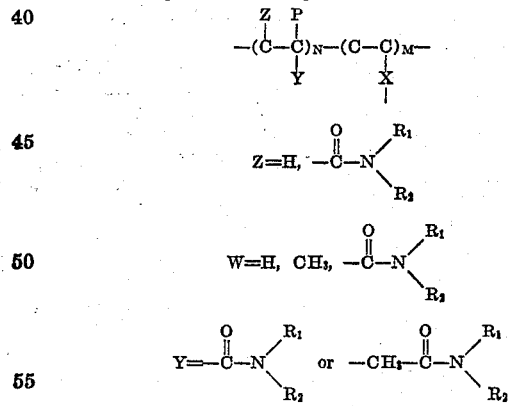

X=a bivalent radical connecting two polymer chains.
N=500 to 5000.
M=50 to 1000.
$R_1$ and $R_2$=H or a lower alkyl or hydroxyalkyl radical containing from 1 to 6 carbon atoms.

The elastomeric, waterproof film can be defined as any elastomeric material which can be dissolved in an organic liquid and which will give a continuous film when the solvent is evaporated and as any elastomeric material which can be suspended in water or an organic liquid and which will give a continuous film when the suspending medium is evaporated. The elastomeric materials which are included within the scope of this invention are listed as follows:

(1) Butadiene polymers: Copolymers of butadiene with acrylonitrile, styrene and esters of acrylic acid.

(2) Polyvinyl acetals: Acetals of polyvinyl alcohol made with higher adehydes such as butyraldehyde, 2-ethyl hexaldehyde and heptaldehyde.

(3) Vinyl polymers: Homopolymers and copolymers such as those made from vinyl chloride, esters of acrylic acid, esters of methacrylic acid, and vinyl acetate.

(4) Chloroprene: Polymers and copolymers of chloroprene with acrylonitrile, styrene, and esters of acrylic esters.

(5) Diisocyanate-linked condensation elastomers: Diisocyanates such as toluene diisocyanate reacted with relatively short linear polyester molecules to form polyurethanes and polymers produced from the reaction of diisocyanates with diamines such as 3,3′(2,2-dimethyltrimethylenedioxy) bis propyl amine.

(6) Cellulose esters: Cellulose esters such as cellulose acetate, cellulose propionate and celluose acetate butyrate.

When the fim-forming elastomer is used as a suspension, water or an organic liquid may be used as the suspending medium. When the elastomer is used as a solution, an organic solvent may be used. Since this organic solvent is not critical, it may be chosen from any number of organic solvents which are commercially available and economically feasible to use in this process.

When the elastomer is used as a suspension, the solids may constitute any percent of the total suspension but a high percent solids is usually desirable. The preferred range is 5%–80% solids. This range of 5%–80% is also preferred when the elastomer is used in a solution.

Although a wide range of organic pigments may be used according to our invention, we prefer those made from polymerizable monomers containing amide groups such as acrylamide, N-substituted acrylamides, vinyl lactams, fumaric amide, and substituted fumaric amide and polymerizable monomers containing hydroxyl groups such as 2-hydroxyethyl acrylate, 2-hydroxypropyl acrylate and allyl alcohol.

When a film-forming latex of the elastomeric material is used, the organic pigment may be suspended in the latex directly or suspended in water and then added as a water suspension. The organic pigment can be added so as to constitute any part of the dry film. The desired range is 5%–60% based on the dry film or coating.

In addition to organic hydrophilic pigments, other materials may be added to the latices to improve the appearance of physical properties of the coating. These materials are curing agents such as sulfur, zinc oxide, and rubber-type accelerators; thermosetting resins such as urea-formaldehyde, melamine-formaldehyde and phenolic; plasticizers such as dioctyl phthalate, dioctyl adipate tricresyl phosphate, and dibutyl phthalate; stabilizers such as phenyl-beta-naphthylamine, zinc oxide and triphenyl phosphite; colored pigments; and flame-resisting agents such as antimony trioxide and tricresyl phosphate.

After all of the desired materials have been added to the latex, it can be coated on metal surfaces, on textile fabrics, leather, or paper. Multiple coats may be used if desired. The amount of dry coating used to waterproof a particular material is dependent on the nature of the material. Usually a fabric will become waterproof if the coating is applied in two coats to provide a dry coating which weighs 1 ounce per square yard. However, any amount that is desired may be applied and any number of coating operations depending upon the use for which the material is intended.

The desired range of the dry coating is 0.25–10.0 ounces per square yard. The coating may be deposited on the surface on one or both sides of the fabric or the material may be impregnated so that each fiber is coated. After the final coating has been applied, the coating material is heated to cure the coating. The temperature and time of heating is dependent on the particular elastomer, curing agents, and resins that are used. The cured film or coating will withstand a 6-foot head of water. The rate of water vapor transmission of these coatings is a function of the amount of organic hydrophilic pigment which they contain and varies from 0.005 gram to 0.10 g./hr./10 cm.$^2$, if the coatings contain 5–60% organic pigment. For apparel use, it has been found that a minimum transmission rate of approximately 0.025 g./hr./10 cm.$^2$ is preferred in order to provide maximum comfort to the wearer under most climatic conditions. This rate is attained if the coating contains about 20–50% of the pigment. Higher rates of water vapor transmission are obtained with concentrations of pigment greater than about 50% but some loss in the wet strength of the coating results.

When the elastomer is dissolved in an organic liquid, the organic pigment may be added to it as a suspension in more of the same organic solvent or may be added directly to the elastomer dissolved in the organic solution, and dispersed by suitable agitation. The properties of the final film may be improved in some cases by the addition of curing agents, plasticizers, stabilizers, colored pigments, thermosetting resins, and flame-resisting agents as illustrated above for elastomeric suspensions.

The coating dope composed of organic liquid, elastomer, hydrophilic organic pigments and any desired modifiers can be coated to give waterproof vapor-permeable films or coatings by evaporating the organic liquid. When a curing agent is used, the film can be cured by heating. The final dry film may be composed of from 15–60% hydrophilic organic pigment. The desired range is from 25–50%. The amount of coating which is applied to the material is dependent on the ultimate use of the coated material, but a coating of 1 ounce per square yard of material is usually enough to make the material waterproof. Coatings of 0.25–10.0 ounces per square yard represent the desired range.

The final coated materials can withstand a 6-foot head of water and in common with the coatings deposited from a suspension, the vapor transmission rate is dependent on the amount of hydrophilic pigment in the film or coating ranging from 0.005 to 0.10 g./hr./10 cm.$^2$ if the coatings contain 5–60% organic pigment when the relative humidity is 50% on one side of the film or coated fabric and 100% on the other side. Water vapor transmission rates of 0.025 to 0.040 g./hr./10 cm.$^2$ are sufficient for rainproof wearing apparel.

In the practice of our invention, the dry films may be treated with solvents for the elastomer to improve the gloss or adhesion. The coated materials can be calendered before or after curing to improve the surface and appearance of the product. The following examples are intended to illustrate the practice of our invention but are not intended to limit it to these particular embodiments:

*Example 1*

Thirty grams of organic pigment which has a composition 65% N,N-dimethylacrylamide, 25% methyl methacrylate, and 10% divinylbenzene was suspended in 100 grams of heptane by simple agitation. The suspended particles were 0.1 micron to 10 microns in diameter. Four grams of zinc oxide, 2 grams of sulfur and 1 gram benzothiazoyl disulfide were added to the suspension. Seventy grams of rubber were dissolved in the suspension. The rubber was composed of 70% butadiene–30% acrylonitrile.

The final mixture was coated on cotton, cellulose acetate, and nylon textile fabrics. Two coating operations were made and the increased weight of the fabric due to the coating was 1 ounce per square yard. The coated fabrics were heated to 140° for 5 minutes. The coated fabrics showed a water vapor transmission rate of 0.035 g./hr./10 cm.$^2$ when the relative humidity was 100% on one side of the fabric and 50% on the other side. The coated fabrics wihheld a 6-foot head of water.

*Example 2*

Thirty grams of organic pigment which had the composition 60% N-isopropylacrylamide, 30% methyl methacrylate, and 10% ethylene glycol diacrylate was suspended in 200 grams isopropyl alcohol. Five grams of urea-formaldehyde-melamine resin, 70 grams dibutyl sebacate, and 70 grams polyvinyl butyral were dissolved in the pigment suspension. The resulting mixture was coated in three coating operations on cotton, nylon, and cellulose acetate textile fabrics. The coating was applied so that the coating weighed one ounce per square yard. The coated fabrics were heated to 140° C. for 5 minutes, after which the coated fabrics were tested, and it was found that they transmitted water vapor at the rate of 0.033 g./hr./10 cm.$^2$ when the relative humidity was 100% on one side of the fabric and 50% on the other side. The coated fabrics withheld a 6-foot head of water.

Example 3

Four grams of an organic pigment having the composition 65% N,N-dimethylacrylamide–25% methyl methacrylate–10% divinylbenzene was suspended in 200 grams of 75% ethyl alcohol–25% water. Seventy grams of polyamide composed of 40% nylon 66 and 60% nylon 6 was dissolved in the alcohol water mixture that contained the suspended pigment. Fifteen grams isododecylphenol was added to the mixture. This final mixture was coated on cotton and nylon fabrics.

The dry coating weighed 1 ounce per square yard, and the coated fabrics transmitted water vapor at the rate of 0.035 g./hr./10 cm.$^2$ when the relative humidity was 100% on one side of the fabric and 50% on the other side. The coated fabrics withheld a 6-foot head of water.

Example 4

Thirty grams of organic pigment having the composition 70% N-isopropylacrylamide–20% styrene 10% divinylbenzene was suspended in 200 grams butyl acetate. Seventy grams of cellulose acetate butyrate and 21 g. dibutyl phthalate were dissolved in the suspension. The mixture was coated on polyethylene terephthalate and cotton fabrics. The coated fabrics transmitted water vapor at the rate of 0.031 g./hr./10 cm.$^2$ when the relative humidity was 100% on one side of the fabric and 50% on the other side. The coated fabrics withheld a 6-foot head of water.

Example 5

Fifteen grams of the organic pigment having the composition 65% N,N-dimethylacrylamide–25% styrene–10% divinyl benzene was suspended in 100 grams of butyl acetate. Thirty grams of a low molecular polyester was dissolved in the butyl acetate. The polyester was prepared from adipic acid and ethylene glycol in the molar ratio of 9:10. The butyl acetate containing the organic pigment and polyester was stirred at 85° C. and 15.5 parts naphthalene-1,5-diisocyanate per 100 parts of polyester was added.

After heating the mixture for 30 minutes, cotton and nylon fabrics were coated with three coats. The coating was applied to give one ounce per square yard of dry coating, and the coated fabrics were heated at 150° C. for 5 minutes to cure the polyurethane. The coated fabrics transmitted water vapor at the rate of 0.039 g./hr./10 cm.$^2$ when the relative humidity was 100% on one side of the fabric and 50% on the other side. The coated fabrics withheld a 6-foot head of water.

Example 6

Thirty grams of organic pigment which had a composition 65% N,N-dimethylacrylamide, 25% methyl methacrylate, and 10% divinylbenzene was suspended in 100 grams of water by simple agitation. The suspended particles were 0.1 micron to 10 microns in diameter. Forty grams of zinc oxide, 2 grams of sulfur and 1 gram benzothiazoyl disulfide were added to the suspension. The suspension was made basic to pH 10 with sodium hydroxide solution. The resulting mixture was added to 140 grams of rubber latex, which was 50% acrylonitrile-butadiene copolymer.

The mixture was blended by slow agitation, and the resulting suspension adjusted to a suitable coating viscosity by the addition of one gram of ammonium caseinate. The adjusted coating mixture was coated on cellulose acetate, nylon and cotton textile fabrics. Two coating operations were made and the increased weight of the fabrics due to the dry coating was 1 ounce per square yard. The fabrics were heated to 140° C. for five minutes. The coated fabrics showed a water vapor transmission rate of 0.035 g./hr./10 cm.$^2$. The fabrics withheld a hydrostatic head of 6 feet of water.

Example 7

Thirty grams of organic pigment which had a composition of 60% N-isopropylacrylamide, 30% methyl methacrylate and 10% ethylene glycol diacrylate was suspended in 100 grams of water. The suspension was adjusted to pH 10 with sodium hydroxide solution and 5 grams of zinc oxide, 5 grams dioctyl phthalate and 3 grams antimony trioxide were added to the pigment suspension. This mixture was then added with gentle stirring to a 50% solids latex of polychloroprene. The final mixture was coated on glass-fiber textile fabrics to give a coating of one ounce per square yard. The coated fabric was heated to 140° C. for 30 minutes. The fabric was flame-resistant and had a water-vapor transmission rated at 0.033 g./hr./10 cm.$^2$. The coated fabric withstood a 6-foot head of water.

The final latex was also coated on metal surfaces where it was cured by heating. The cured film was then stripped from the metal and was flexible and tough. The film transmitted water vapor at the rate of 0.066 g./hr./10 cm.$^2$ when the water vapor pressure on one side was 23.8 millimeters and 11.9 millimeters of Hg on the other side.

Example 8

Fifty grams of pigment which had the composition 35% vinylpyridine, 35% methacrylamide, 20% acrylic acid and 10% divinylbenzene was suspended in 300 grams of latex. The latex was composed of 30% polyvinyl butyral. The plasticizer was dibutyl sebacate and was present as 50% of the total polyvinyl butyral solids. Four grams of urea-formaldehyde-melamine resin was added and the final mixture was coated on cotton and nylon fabrics. The coating on a dry basis weighed 1.5 ounces per square yard. The coated fabrics were heated to 120° C. for 5 minutes to cause the urea-formaldehyde-melamine resin to cross-link. The fabrics were waterproof to a 6-foot head of water and were able to transmit water-vapor at the rate of 0.031 g./hr./10 cm.$^2$.

Example 9

Using the general method in Example 6, 20 grams of organic pigment which had the composition 50% methacrylamide, 40% 2-ethylhexylacrylate and 10% N,N'-methylenebisacrylamide was mixed with 50 grams of rubber latex. The latex contained 25 grams of acrylonitrile-butadiene copolymer. Fabrics coated with this material transmitted water-vapor at the rate of 0.036 g./hr./10 cm.$^2$. The fabrics withstood a 6-foot head of water.

Example 10

Using the general method outlined in Example 8, 15 grams of the organic pigment which had a composition 65% N,N-dimethyl acrylamide, 25% methyl methacrylate, and 10% divinylbenzene was mixed with 60 grams of an organosol which was 25% solids. The solid was the elastomer made by reacting 1 mole toluene diisocyanate with 1.5 mole of 3,3'(2,2-dimethyltrimethylene dioxy) bis propylamine. The suspending liquid was 1,4-dioxane.

Textile fabrics were coated with the organosol. On a dry basis, one ounce per square yard of coating was applied in two coating operations. The coated material was heated to 140° C. for 5 minutes and was found to be waterproof for a 6-foot head of water. The fabric was able to transmit water-vapor at the rate of 0.042 g./hr./10 cm.$^2$.

*Example 11*

Thirty grams of organic pigment which had the composition 65% N,N-dimethylacrylamide, 25% methyl methacrylate, and 10% divinylbenzene was suspended in 100 grams of toluene. The suspended particles were 0.1 micron to 10 microns in diameter. Four grams of zinc oxide, 2 grams of sulfur, and 1 gram of benzothiazoyl disulfide was added to the suspension. Seventy grams of rubber, which was composed of 70% butadiene–30% acrylonitrile, was dissolved in the suspension.

The final mixture was coated on cotton, cellulose acetate and nylon textile fabrics. Two coating operations were made and the increased weight of the fabric due to the dry coating was one ounce per square yard. The coated fabric was heated to 140° C. for 5 minutes to cure the rubber. The coated fabric transmitted water-vapor at the rate of 0.035 g./hr./10 cm.$^2$ when the relative humidity on one side of the fabric was 100% and 50% on the other side. The coated fabric withheld a 6-foot head of water.

*Example 12*

The following materials were suspended in 70 grams of water:

(1) 50 grams organic pigment having the composition 45% methacrylamide, 45% N-isopropyl acrylamide, and 10% triallyl cyanurate.
(2) 1.0 gram sulfur.
(3) 2.5 grams zinc oxide.
(4) 2.5 grams magnesium oxide.
(5) 1.0 gram thiocarbanilide.
(6) 1.0 gram N-phenyl-2-naphthylamine.
(7) 1.0 gram casein.

This suspension was mixed with 200 grams of polychloroprene latex composed of 50% solids.

The final mixture was coated on various textile fabrics to produce waterproof fabrics. The dry coating weight was approximately 1 ounce per square yard. These coated fabrics transmitted water-vapor at the rate of 0.032 g./hr./10 cm.$^2$. They were waterproof to a 6-foot head of water.

*Example 13*

Thirty grams of the organic pigment having the composition 60% N,N-dimethylacrylamide, 30% ethylacrylate, and 10% divinylbenzene was suspended in 60 grams of water. Two grams of ammonium stearate and 240 grams of a 25% solution of polychloroprene in toluene was added to the water suspension. The mixture was stirred to cause the water suspension to become emulsified in the toluene solution. Three grams of zinc oxide, 0.6 gram of sulfur, 0.6 gram of thiocarbanilide, and 6 grams of mineral oil were added with stirring.

The final suspension was coated on nylon, cotton, and polyester textile fabrics. The dry coating weighed 1 ounce per square yard. The coatings were heated to 140° C. for 30 minutes and the coated fabrics were found to withstand a 6-foot head of water, but transmitted water-vapor at the rate of 0.032 g./hr. 10 cm.$^2$ when the relative humidity was 100% on one side of the fabric and 40% on the other side.

*Example 14*

Using the general method described in Example 12, 30 grams of organic pigment having the composition of 45% fumaric amide, 45% vinyl acetate, and 10% triallyl cyanurate was suspended in a toluene solution of a copolymer composed of 80% butyl acrylate and 20% acrylonitrile. This mixture was coated on various fabrics to give waterproof fabrics having 1 ounce per square yard of dry coating. The fabric transmitted water-vapor at the rate of 0.033 g./hr./10 cm.$^2$.

*Example 15*

Using the general method described in Example 12, 30 grams of pigment having the composition 70% N,N-dimethylacrylamide, 20% methyl methacrylate and 10% divinylbenzene was suspended in an acetone solution of 70 grams of a copolymer of vinyl chloride and vinyl acetate. Fifty grams of dioctyl phthalate was added and the resulting mixture was coated on cloth, paper, and leather. Nylon and cotton fabrics having 1 ounce per square yard of dry coating withheld a 6-foot head of water, but transmitted water at the rate of 0.027 g./hr./10 cm.$^2$.

*Example 16*

Forty grams of an organic pigment having the composition 45% acrylamide, 45% N-isopropylacrylamide and 10% divinylbenzene was suspended in 200 grams of 75% ethanol–25% water. Seventy grams of copolyamide composed of 40% nylon 66 and 60% nylon 6 was dissolved in the alcohol-water mixture that contained the suspended pigments. Fifteen grams of isododecylphenol was added and the final mixture was coated on cloth and leather.

Nylon and cotton fabrics having 1.2 ounces of dry coating withheld a 6-foot head of water. The coated fabrics transmitted water-vapor at the rate of 0.035 g./hr./10 cm.$^2$ when the relative humidity was 100% on one side of the fabric and 50% on the other side.

*Example 17*

Fifteen grams of the pigment having the composition 65% N,N-dimethylacrylamide, 25% styrene and 10% divinylbenzene was suspended in 100 grams of butyl acetate. Thirty grams of low molecular weight polyester was dissolved in the butyl acetate. The polyester was prepared from adipic acid and ethylene glycol in the molar ratio of 9:10. The butyl acetate containing the organic pigment and the polyester was stirred at 85° C. and 15.5 parts of naphthalene-1,5-diisocyanate/100 parts of polyester were added. The mixture was coated on textile fabrics after heating for 30 minutes.

Nylon and cotton fabrics were coated with 1 ounce per square yard of dry coating. The dry coated fabrics were heated to 150° C. for 5 minutes to cause the diisocyanate to react with the polyester. The coated fabrics withheld a 6-foot head of water but transmitted water-vapor at the rate of 0.039 g./hr./10 cm.$^2$.

*Example 18*

One hundred grams of cross-linked polymer having the composition 70% N,N-dimethylacrylamide, 20% methyl methacrylate, and 10% divinylbenzene was suspended in 1000 g. of a 1:1 mixture of toluene and isopropanol. One hundred grams of polyvinyl butyrate, 110 g. of dibutyl sebacate, 5 g. of urea-formaldehyde-melamine resin, and 0.5 g. of sodium acid phosphite were dissolved in the suspension. This mixture was coated on cotton, nylon, and Dacron fabrics. The dry coatings weighed 1.5 ounces per square yard and were applied in 2 or 3 coating operations. The dry coatings were heated in an oven for 5 minutes to cure the resin. The coated fabrics were water-proof to a 6 foot head of water and were able to transmit water vapor at the rate of 0.033 g./hr./10 cm.$^2$.

As used herein, the term cross-linked organic pigment containing amide groups is intended to describe a high polymer which is infusible at temperatures up to about 300° C. and insoluble in water in organic solvents, and in the elastomeric material. In order to obtain these characteristics, it is essential that a constituent be present, which serves as a cross-linking agent. This results in the formation of a polymeric pigment which is infusible and insoluble. From 1 percent up to about 20 percent of a cross-linking agent is employed. Examples of suitable cross-linking agents which can be employed include those doubly ethylenically unsaturated organic compounds, such as divinylbenzene, diallyl terephthalate, allyl acrylate, methylenebisacrylamide, etc. The useful group of such cross-linking agents includes divinyl and diallyl organic compounds containing from 5 to 20 carbon atoms, such as those indicated above.

In our preferred embodiment the monoethylenically unsaturated aliphatic amide compounds which can be employed in the preparation of the polymeric pigments of this invention include the maleic amides, fumaric amides, itaconic amides, citraconic amides, and acrylamides wherein the nitrogen atoms of any of these amides and the alpha-position of acrylamide are joined to two members selected from the group consisting of lower alkyl and hydroxyalkyl radicals containing from 1 to 6 carbon atoms and a hydrogen atom.

Examples of these compounds include acrylamide, alphamethacrylamide, N-methyl-alpha-methacrylamide, N-isopropyl acrylamide, N,N-dimethylacrylamide, N-(2-hydroxyethyl)-acrylamide, N-butyl-alpha-methacrylamide, N,N,N'N'-tetramethylmaleamide, fumaric amide, N,N'-diethylitaconic diamide, the corresponding amides and also the ester-amides of maleic, fumaric, itaconic and citraconic acids, and numerous other equivalent amides, ester amides and N-substituted derivatives thereof such as will be apparent to those skilled in the art. The alkyl radicals for the alcoholic portion of the ester amides of the dibasic amides can be advantageously derived from those alkyl radicals containing from 1 to 6 carbon atoms.

The method for polymerizing polymerizable monomers so as to prepare polymers or copolymers thereof with other monoethylenically unsaturated compounds as well as the methods for cross-linking such polymers and copolymers are well illustrated in the prior art with which this invention is not directly concerned.

In one embodiment of this invention, the polymerization of such cross-linked polymers or copolymers is carried out in accordance with a solution-polymerization technique such as that technique involving the employment of a redox catalyst system. The known solution polymerization procedures can generally be adapted to produce a polymeric product which is finely divided, and which can be separated from the medium of polymerization as finely divided particles having diameters of no more than 10 microns and generally considerably less than 5 microns, preferably less than 2 microns. In some instances, the pigment polymer can be ground in a comminuting mill of conventional design in order to produce a sufficiently small particle size.

When the polymeric pigment is formed in an aqueous medium, it is advantageous to carry out the polymerization in the presence of a surface-active agent or a protective colloid in order to obtain the desired particle size employing techniques well known in the art. The aqueous suspension of polymeric pigment material can then be dried and ground in a suitable mill or it can be dried by spraying the suspension of polymer into a heated chamber with an atomizer nozzle (under circumstances which permit the suspended medium to be evaporated) and separating the dried powder of the polymeric material for use as the polymeric pigment. Generally such spray-drying techniques can be readily developed so as to produce a polymeric pigment of the desired size although further grinding can be performed if required.

The polymeric pigment can be prepared by polymerizing a monoethylenically unsaturated aliphatic amide compound in a solution in acetone containing from about 1% to about 5% of a cellulose ester employing a peroxy type polymerization catalyst at an elevated temperature whereby a suspension of polymeric pigment particles having a diameter of 10 microns is produced in the presence of a dissolved cellulose ester which functions as a protective colloid and maintains the finely divided polymeric pigment in uniform suspension. This suspension of the pigment can be filtered with essentially no loss of the pigment formed and this suspension of the polymeric pigment in acetone can be advantageously blended with elastomeric materials as discussed above.

When the polymer for use as the polymeric pigment is made in water, catalysts which can be advantageously employed include potassium persulfate, ammonium persulfate, hydrogen peroxide, sodium perborate and numerous other peroxy catalysts. A redox catalyst system can be advantageously employed under these circumstances. It is also advantageous to employ surface-active agents or a protective colloid in order to control the particle size and facilitate the preparation of polymeric materials of suitable particle size for use as the polymeric pigment.

When the polymer for use as the polymeric pigment is made in an organic solvent, suitable catalysts include benzoyl peroxide, acetyl peroxide, cumene hydroperoxide, azo-bis-isobutyronitrile and the like as well as numerous other peroxy type catalysts.

Fabrics made from fibers of cotton, silk, viscose, cellulose esters (e.g. cellulose acetate), cellulose ethers, superpolyamides (e.g. nylon), glass, asbestos, flax, hemp, wool, polyesters, etc. can be employed in the preparation of coated or impregnated fabrics in accordance with the above process.

We claim:
1. A process for preparing a fabric having a coating of a synthetic resinous composition which resists the passage of liquid water but permits transmission of water vapor comprising mixing 15-60 percent of cross linked organic pigment containing amide groups based on the dry coating with an elastomer carried in a liquid medium containing 5-80 percent solids content of the elastomer, and coating on a fabric.

2. A process for obtaining a coated fabric containing a synthetic resinous composition which resists the passage of liquid water but permits transmission of water vapor comprising adding 16-60 percent of a cross linked organic pigment containing amide groups based on the dry coating to a liquid medium containing 5-80 percent solids content of an elastomer, and coating on a fabric so that the coated fabric has 0.25-10 ounces per square yard.

3. A process for obtaining a coated fabric which resists the passage of liquid water but permits transmission of water vapor comprising adding 15-60 percent of a cross linked organic pigment containing amide groups based on the dry coating to a solution of elastomer containing 5-80 percent by weight elastomer, and coating on a fabric.

4. A process for obtaining a coated fabric which resists the passage of liquid water but permits transmission of water vapor comprising adding 15-60 percent of a cross linked organic pigment containing amide groups based on the dry coating to a latex containing 5-80 percent solids of an elastomer, and coating on a fabric.

5. A process for obtaining a coated fabric which resists the passage of liquid water but permits transmission of water vapor comprising adding 15-60 percent of cross linked organic pigment containing amide groups based on the dry coating to a solution containing 5-80 percent by weight of an elastomer, and coating on a fabric so that the dry coating weighs 0.25-10.0 ounces per square yard.

6. A process for obtaining a coated fabric which resists the passage of liquid water but permits transmission of water vapor comprising adding 15-60 percent of a cross linked organic pigment containing amide groups based on the dry coating to a latex containing 5-80 percent solids of an elastomer, and coating on a fabric so that the dry coating weighs 0.25-10.0 ounces per square yard.

7. A fabric suitable for rain wear which resists the passage of liquid water but permits transmission of water vapor comprising a fabric having a coating thereon containing a cross linked organic pigment containing amide groups in intimate combination with an elastomer.

8. A water-resistant fabric which permits transmission of water vapor comprising a fabric having a coating thereon containing 15–60 percent of a cross linked organic pigment containing amide groups based on the dry coating carried on a fabric in intimate combination with an elastomer coated on the fabric.

9. A water-resistant fabric which permits transmission of water vapor comprising a fabric having a coating thereon containing 15–60 percent based on the dry coating of a cross linked organic pigment containing amide groups based on the dry coating, carried in an elastomer and having 0.25–10.0 ounces per square yard of coating by weight.

10. A water-resistant fabric which permits transmission of water vapor obtained by coating the fabric with a solution containing 5–80 percent by weight of an elastomer and 15–60 percent of a cross linked organic pigment containing amide groups based on the dry coating so that the weight of the coating on the fabric is 0.25–10.0 ounces per square yard.

11. A water-resistant fabric which permits transmission of water vapor comprising a fabric having a coating of 0.25–10.0 ounces per square yard dry basis of an elastomer containing 15–60 percent of a cross linked organic pigment containing amide groups based on the dry coating which has been coated from a latex in which 5–80 percent solids of the latex was composed of the elastomer.

12. A water-resistant fabric which permits transmission of water vapor comprising a fabric containing a coating weighing 0.25–10.0 ounces per square yard dry basis of polychloroprene containing 15–60 percent of a cross linked organic pigment containing approximately 70 percent N,N-dimethylacrylamide based on the dry coating, said polychloroprene coated from a latex containing 5–80 percent by weight of the polychloroprene.

13. A water-resistant fabric which permits transmission of water vapor comprising a fabric containing a coating weighing 0.25–10.0 ounces per square yard dry basis of polychloroprene containing 15–60 percent of a cross linked organic pigment containing approximately 70 percent N,N-dimethylacrylamide based on the dry coating carried in polychloroprene deposited from a solution containing 5–80 percent by weight of the polychloroprene.

14. A water-resistant fabric which permits transmission of water vapor comprising a fabric containing a coating weighing 0.25–10.0 ounces per square yard dry basis of plasticized polyvinyl butyral containing 15–60 percent of a cross linked organic pigment containing approximately 70 percent N,N-dimethylacrylamide based on the dry coating carried in plasticized polyvinyl butyral deposited from a solution containing 5–80 percent by weight of the butyral.

15. A process for preparing a film which resists the passage of liquid water but permits transmission of water vapor comprising mixing 15–60% of cross-linked organic pigment containing amide groups based on the dry coating with an elastomer carried in a liquid medium containing 5–80% solids content of the elastomer, and coating on a smooth support.

16. A process for preparing a synthetic resinous composition which resists the passage of liquid water but permits transmission of water vapor comprising adding a cross-linked polymeric composition having the following structural formula:

$$-(\overset{Z}{\underset{Y}{C}}-\overset{W}{\underset{X}{C}})_N-(C-C)_M-$$

in which Z is a monovalent radical selected from the group consisting of H and

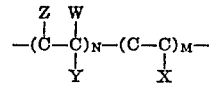

W is a monovalent radical selected from the group consisting of H—CH$_3$, and

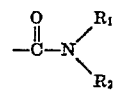

Y is a monovalent radical selected from the group consisting of

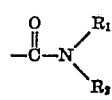

X is a bivalent radical connecting two polymer chains and is selected from the group consisting of alkylene and arylene radicals.

N is 500 to 5000.

M is 50 to 1000.

R$_1$ and R$_2$ are selected from the group consisting of H, lower alkyl and hydroxyalkyl radicals containing from 1 to 6 carbon atoms, to an elastomer in a liquid medium and coating the elastomer as a film on a support.

References Cited in the file of this patent
UNITED STATES PATENTS

| | | |
|---|---|---|
| 2,598,663 | Kropa | June 3, 1952 |
| 2,614,089 | Harrison et al. | Oct. 14, 1952 |
| 2,832,747 | Jackson | Apr. 29, 1958 |
| 2,893,970 | Caldwell et al. | July 7, 1959 |

FOREIGN PATENTS

| | | |
|---|---|---|
| 512,319 | Australia | July 15, 1953 |